L. P. LARSON.
Wheel-Vehicle.
No. 161,245.
Patented March 23, 1875.
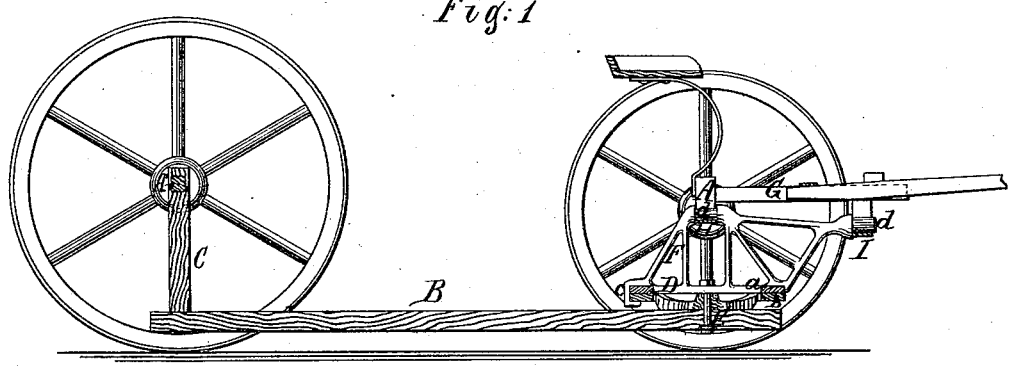
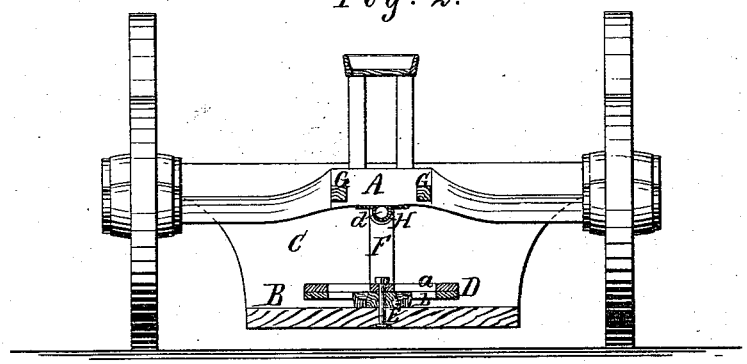

UNITED STATES PATENT OFFICE.

LARS P. LARSON, OF YONKERS, NEW YORK.

IMPROVEMENT IN WHEEL-VEHICLES.

Specification forming part of Letters Patent No. 161,245, dated March 23, 1875; application filed January 20, 1875.

*To all whom it may concern:*

Be it known that I, LARS P. LARSON, of Yonkers, in the county of Westchester and State of New York, have invented a certain new and useful Improvement in Wheel-Vehicles, of which the following is a specification:

This invention is illustrated in the accompanying drawing, in which Figure 1 represents a longitudinal center section. Fig. 2 is a transverse section in the plane of line x x, Fig. 1.

Similar letters indicate corresponding parts.

This invention relates particularly to wagons and other vehicles designed for transporting stone, and other heavy substances, and the platform of which is located below the axles of the wheels.

My invention consists in the combination, with the vehicle, of a fifth-wheel connected to the front axle by a hinged frame, and connected to the platform of the vehicle in such a manner that the said axle is rendered capable of a compound movement independent of the platform, as hereinafter more fully set forth.

In the drawing, the letters A A' designate the front and rear axles of a vehicle of the kind commonly used for carrying stone and other heavy substances, to which end its platform B is located or suspended below the axles. The rear end of the platform is suspended from the rear axle A' by a board, C, or in any other suitable manner, while the front end thereof is suspended from the front axle A by the fifth-wheel, which rests on the upper surface of the platform, together with its paraphernalia, as next described. D designates the fifth-wheel of the vehicle, constructed of an upper and lower plate, *a b*, of circular or segmental shape, and which are connected to each other and to the platform B by an ordinary king-bolt, E. The plates *a b* are held together on their circumference by the lip *c* of a hinged frame or web, F, which forms the connection of the fifth-wheel to the front axle. The frame F is cast with or secured to the top plate *a* of the fifth-wheel, while it is hung to the front axle A and to the futchells G extending therefrom, by means of two pivots, *d*, that are inserted, respectively, in an eye-piece, H, and an eyebolt, I, secured of those parts. This arrangement of the pivots *d* serves to form a hinge-joint to the frame and front axle, through which and the fifth-wheel D the axle is rendered capable of a compound movement. In other words, the axle is capable of movement in a horizontal or vertical direction for the purpose of steering, and for allowing one or the other end of the axles to be raised and lowered independent of the platform.

When a wheel-vehicle passes over a rough or uneven road it happens that the wheels, and through them the axles on one side of the vehicle, at times occupy a lower or higher position than those of the other side, whereby in vehicles of the ordinary kind the wagon platform or bed assumes a laterally-inclined position. In this case the contents of the vehicle are liable to shift or change position, while the occupant of the vehicle is greatly inconvenienced, as is well known to all conversant with the use of wagons. This disadvantage is overcome by my invention, inasmuch as by the hinged frame F the platform is caused to preserve its level at all times irrespective of the positions of the wheels, and I obtain a very useful and improved vehicle.

What I claim as new, and desire to secure by Letters Patent, is—

1. The combination of a frame, F, fastened to the fifth-wheel D, with the front axle connected to said frame by a hinge-joint, substantially as described.

2. The combination of the platform B with a fifth-wheel, D, resting on its upper surface, and provided with a raised frame, F, to which the front axle is connected by a hinge-joint, substantially as and for the purpose described.

In testimony that I claim the foregoing I have hereunto set my hand and seal.

LARS P. LARSON. [L. S.]

Witnesses:
W. HAUFF,
E. F. KASTENHUBER.